Feb. 19, 1929.  A. C. DANKS ET AL  1,702,933
WATER TUBE BOILER
Filed Dec. 14, 1927    3 Sheets-Sheet 1

Feb. 19, 1929.

A. C. DANKS ET AL 1,702,933

WATER TUBE BOILER

Filed Dec. 14, 1927     3 Sheets-Sheet 3

INVENTORS
Alfred C. Danks
and
Kingsley L. Martin
by James E. Bradley
atty

Patented Feb. 19, 1929.

1,702,933

UNITED STATES PATENT OFFICE.

ALFRED C. DANKS, OF CLEVELAND, OHIO, AND KINGSLEY L. MARTIN, OF MONTCLAIR, NEW JERSEY.

WATER-TUBE BOILER.

Application filed December 14, 1927. Serial No. 239,932.

Figure 1:
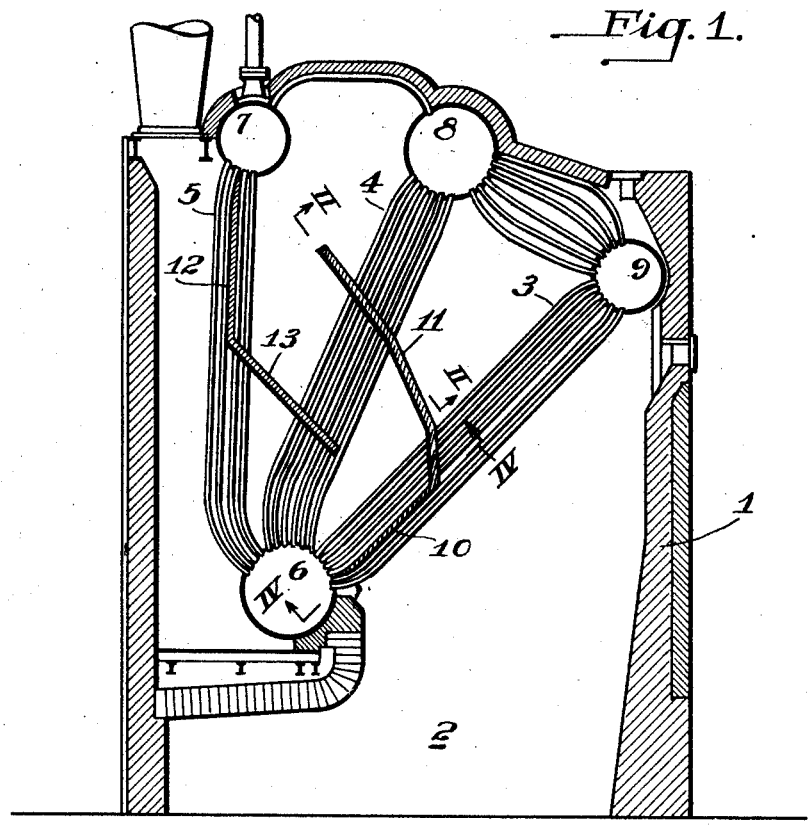
Figure 6:
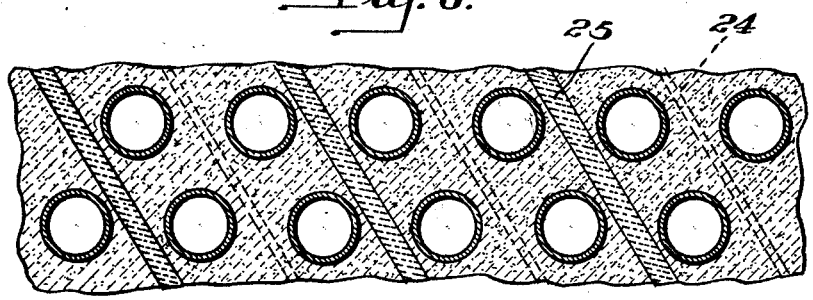
Figure 2:
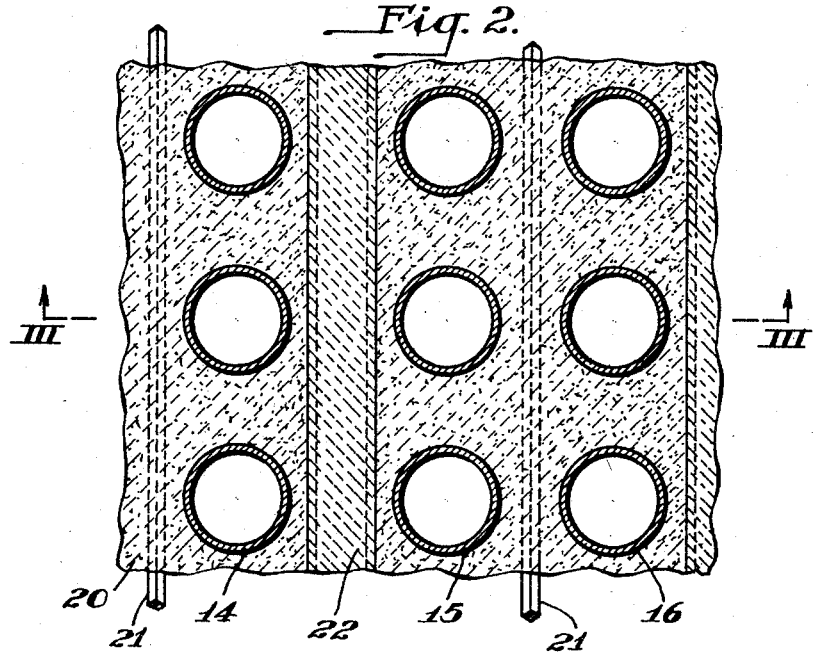
Figure 3:
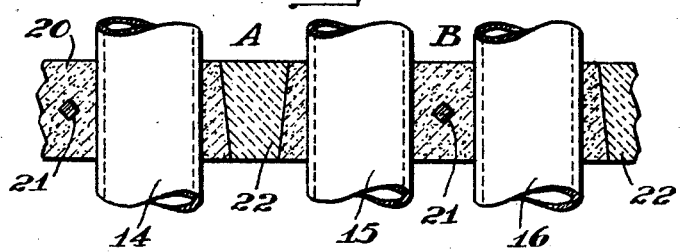
Figure 7:
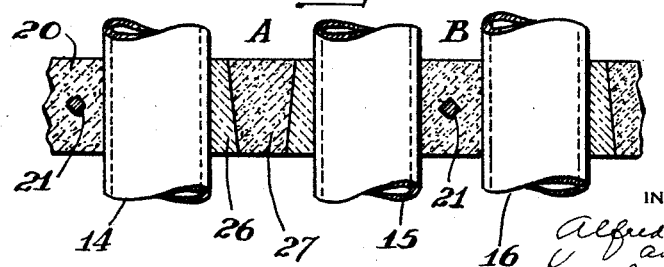
Figure 5:
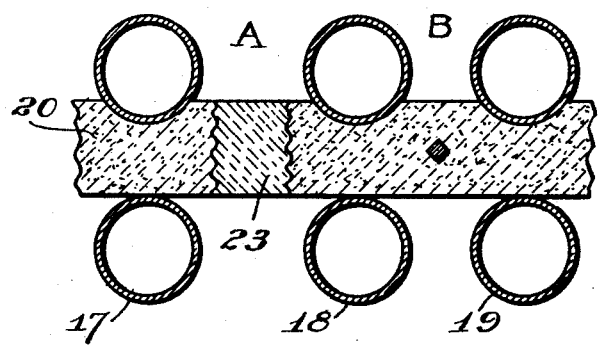
Figure 4:
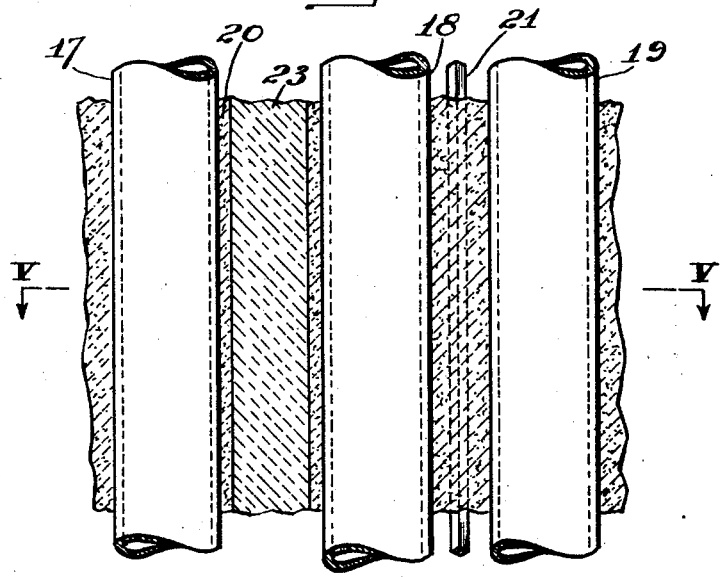

The invention relates to water tube boiler constructions, and particularly to baffle walls, as used in such boilers of a wide variety of types, both horizontal and vertical, such as the Stirling, Connely, Heine, Babcock and Wilcox, Walsh and others. The invention has for its primary objects, the provisions of an improved baffle wall; (1) which shall be gas tight, and at the same time shall permit the ready removal of any tube or tubes which may fail; (2) which is reinforced and supported between banks of tubes, so that it will be maintained in position, even if cracked; (3) which will remain serviceable and efficient under the expansion and contraction, incident to the extreme temperature conditions, to which it is subjected; (4) and in general, which has all the advantages of the ordinary baffle wall built of plastic material, with the added ones of increased strength due to the metal reinforcing employed, and of greater facility in tube replacement, due to the molded refractory sections which are used with the plastic material. Certain embodiments of the invention are illustrated in the accompanying drawings, wherein:

Figure 1 is a vertical section through a vertical water tube boiler showing the location of baffle walls to which the invention is applicable. Fig. 2 is a detail section taken through the baffle, where it crosses the tubes, as on the line II—II of Fig. 1. Fig. 3 is a section on the line III—III of Fig. 2. Fig. 4 is a detail section taken through the baffle where it extends longitudinally of the tubes, as on the line IV—IV of Fig. 1. Fig. 5 is a section on the line V—V of Fig. 4. Fig. 6 is a section through a modified form of baffle. And Fig. 7 is a section similar to that of Fig. 3 through another modification.

By way of illustration, the baffles are shown as applied to a Stirling boiler, but it will be understood that the invention is applicable to the other types of vertical boilers as well as to those of the horizontal types, and that the claims are applicable to all types, unless otherwise limited by their terms. The boiler shown, comprises the setting 1, the fire-box 2, the three banks of tubes 3, 4 and 5, the headers 6, 7, 8 and 9, the front baffle comprising the sections 10 and 11, and the rear baffle comprising the sections 12 and 13, the sections 10 and 12 extending longitudinally of the tubes and the sections 11 and 13 extending transversely of the tubes.

Figs. 2 and 3 indicate the construction of the baffle where it extends transversely of the tubes 14, 15 and 16 of the bank 4, while Figs. 4 and 5 indicate its construction where it extends longitudinally of the tubes 17, 18 and 19 of the bank 3. As shown in these figures, the alternate spaces A and B, are made wide and narrow, respectively, in accordance with the regular practice, the wide spaces being designed to give room for the removal of the tubes, when it becomes necessary to take them out for replacement or repair.

The baffle wall is composed in the main of plastic refractory material 20, well known in the art, which hardens into a strong solid body in a short time after fabrication. This material is reinforced in the narrow spaces B by the metal rods 21, of square cross section, although reinforcing of any other desired material or form may be employed. In the wide spaces A, the plastic material is subdivided by strips of molded refractory material, such as the strips 22 of the wedge cross section shown in Figs. 2 and 3, and the strips 23 of the cross section shown in Figs. 4 and 5. These strips are of any convenient length for handling and installing, and may be of a variety of fire clay or other refractory compositions, which are preformed or molded and hardened, or burned (depending on the composition) before being used. The cross section of these strips will vary, depending on conditions, the wedge section of Fig. 3 being preferably employed, where gravity tends to hold the strips in position, while that of Fig. 5, or one of the same order, is employed in more or less upright baffles where the strips might become accidentally displaced. The main purpose of these strips is to provide for the removal of the baffle material when it becomes necessary to take out a tube, although they are of value for another reason, as later set forth. At such time, the adjacent strip 22 or 23 may be easily knocked out, after which it is not difficult to break out the plastic material 20.

In the construction of Fig. 6, the reinforcing rods 24 and the molded refractory strips 25 alternate, as in the constructions of Figs. 2 and 5, but are arranged diagonally, as illustrated. This construction is desirable for use in the upright baffles of horizontal water tube boilers, such as the Babcock and Wilcox.

Fig. 7 illustrates a modification of the Fig. 3 construction, the refractory molded strips 27 being molded in place between sheets of metal or refractory material 26.

The advantages of the improved baffle will be readily apparent to those skilled in the art. The metal reinforcing adds a large degree of strength to the baffle as a whole, so that in case of cracking, the baffle will maintain itself in position, this being particularly important in the spaces between tube banks where the wall is otherwise unsupported by the tubes. This additional support is also secured without making the baffle too difficult of removal, in part, or in whole, in order to replace tubes; since the use of the molded refractory strips permit alleys to be opened up without difficulty in the wide spaces, it being much easier to knock out these strips, and then the plastic material remaining, than it is to break out a solid wall of plastic material. There is also less cracking in a wall including the molded strips than in a solid wall of plastic material, as the composite wall can give at the joints under contraction and expansion strains induced by severe temperature conditions. As a result, the baffle will not permit the gas leakage past it after a period of service, such as occurs with the ordinary baffle of plastic material. Other advantages and variations in form in which the invention may be embodied will be readily apparent to those skilled in the art.

What we claim is:

1. In combination in a water tube boiler, a baffle wall of originally plastic material hardened in position subdivided at intervals between the tubes by molded refractory material readily removable.

2. In combination in a water tube boiler, a baffle wall of originally plastic material hardened in position subdivided at intervals between the tubes by molded refractory material readily removable and reinforced at intervals in the spaces other than those in which the molded refractory is located.

3. In combination in a water tube boiler having alternate wide and narrow spaces between the tubes, a baffle wall of originally plastic material hardened in position, subdivided in the wide spaces between the tubes by strips of molded refractory material readily removable.

4. In combination in a water tube boiler having alternate wide and narrow spaces between the tubes, a baffle wall of originally plastic material hardened in position provided in the narrow spaces between the tubes with metal reinforcing and subdivided in the wide spaces between the tubes by strips of molded refractory material readily removable.

5. In combination in a water tube boiler, a baffle wall of originally plastic material hardened in position subdivided at intervals between the tubes by strips of molded refractory material readily removable, but shaped so as to normally maintain themselves in position.

6. In combination in a water tube boiler, a baffle wall of originally plastic material hardened in position subdivided at intervals between the tubes by strips of molded refractory material wedge shaped in cross section and readily removable.

7. In combination in a water tube boiler having alternate wide and narrow spaces between the tubes, a baffle wall of originally plastic material hardened in position, subdivided in the wide spaces between the tubes by strips of molded refractory material of wedge shape in cross section.

8. In combination in a water tube boiler having alternate wide and narrow spaces between the tubes, a baffle wall of originally plastic material hardened in position, provided in the narrow spaces between the tubes with metal reinforcing and subdivided in the wide spaces between the tubes by strips of molded refractory material readily removable, but interfitting with the plastic material, so as to prevent accidental displacement.

9. In combination in a vertical water tube boiler having the tubes arranged with alternate wide and narrow spaces, a baffle wall extending longitudinally of a bank of tubes for a portion of the length thereof and transversely of one of the banks of tubes, the baffle being composed of originally plastic material hardened in position, reinforced in the narrow spaces between the tubes, and subdivided in the wide spaces by strips of molded refractory material readily removable.

In testimony whereof, we have hereunto subscribed our names.

ALFRED C. DANKS.
KINGSLEY L. MARTIN.